United States Patent
Murphy et al.

[15] 3,637,090
[45] Jan. 25, 1972

[54] ENDLESS CONVEYOR-BELT SYSTEM AND BELT DIRECTION

[72] Inventors: George R. Murphy, Hudson; Glenn E. Rehn, Olmsted Township; George L. Plum, Lyndhurst, all of Ohio

[73] Assignee: McDowell-Wellman Engineering Company, Cleveland, Ohio

[22] Filed: Aug. 25, 1970

[21] Appl. No.: 66,720

[52] U.S. Cl. ................................................198/184
[51] Int. Cl. .................................................B65g 15/00
[58] Field of Search ....................................198/184

[56] References Cited

UNITED STATES PATENTS

| | | | |
|---|---|---|---|
| 973,079 | 10/1910 | Seeberger | 198/184 X |
| 3,253,698 | 5/1966 | Murphy | 198/184 |

FOREIGN PATENTS OR APPLICATIONS

| | | | |
|---|---|---|---|
| 649,883 | 2/1951 | Great Britain | 198/184 |

*Primary Examiner*—Richard E. Aegerter
*Assistant Examiner*—Hadd S. Lane
*Attorney*—McNenny, Farrington, Pearne & Gordon

[57] ABSTRACT

There is provided an improved belt-storage system and apparatus useful therewith, characterized by a belt direction changing and translating apparatus effective to change the direction of movement of the belt, e.g. reverse it entirely, and to translate the belt laterally, e.g. so that portions can be disposed alongside each other. One portion is then available for conveying action, and the other for belt storage. The lengths of each may be adjusted upwardly and downwardly, respectively, or vice versa. The apparatus includes supporting framework for pulley systems which coact with each reach of the belt as it enters or leaves the conveyor portion and as it leaves or enters the storage portion, respectively.

11 Claims, 6 Drawing Figures

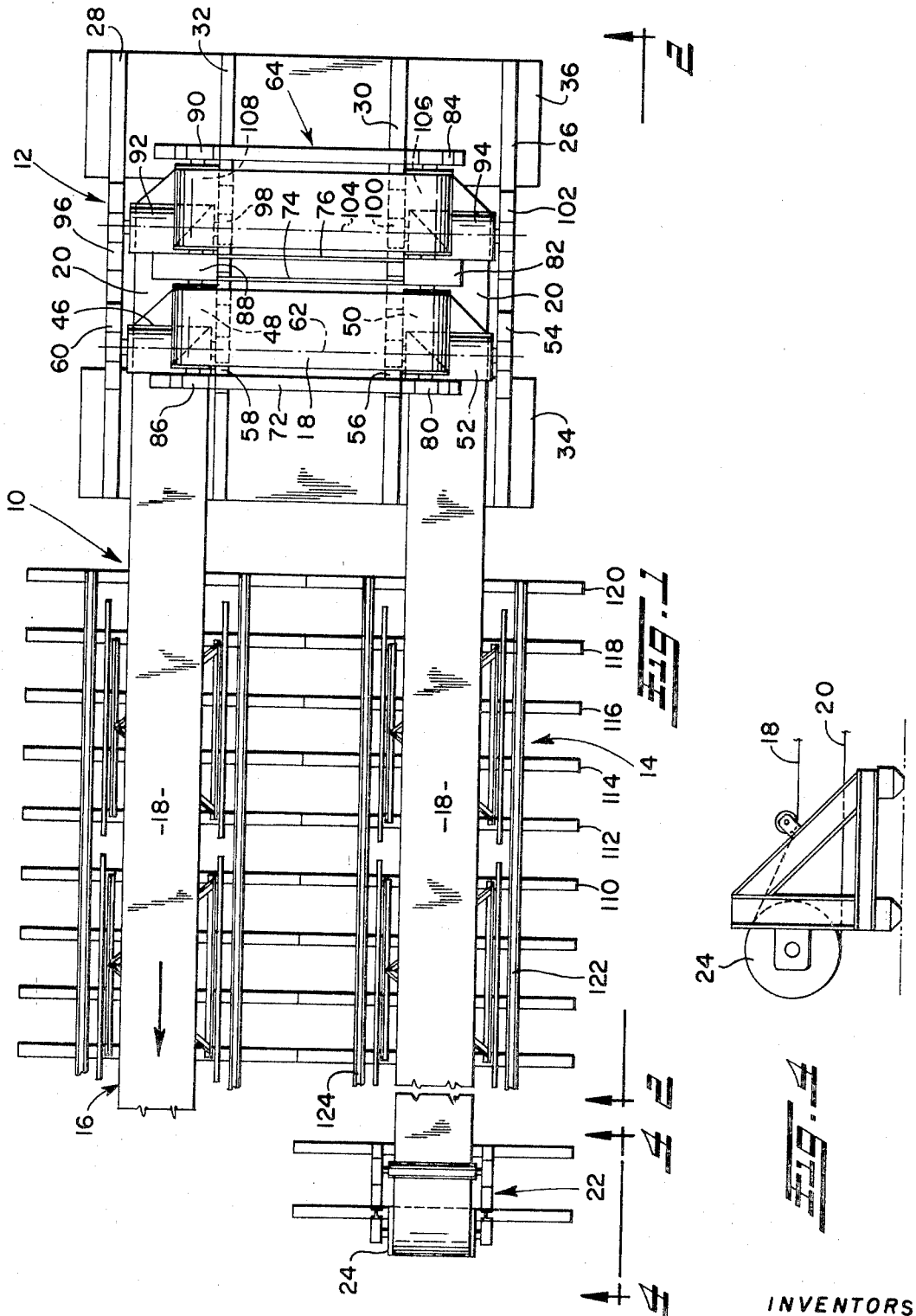

PATENTED JAN 25 1972
3,637,090
SHEET 2 OF 3
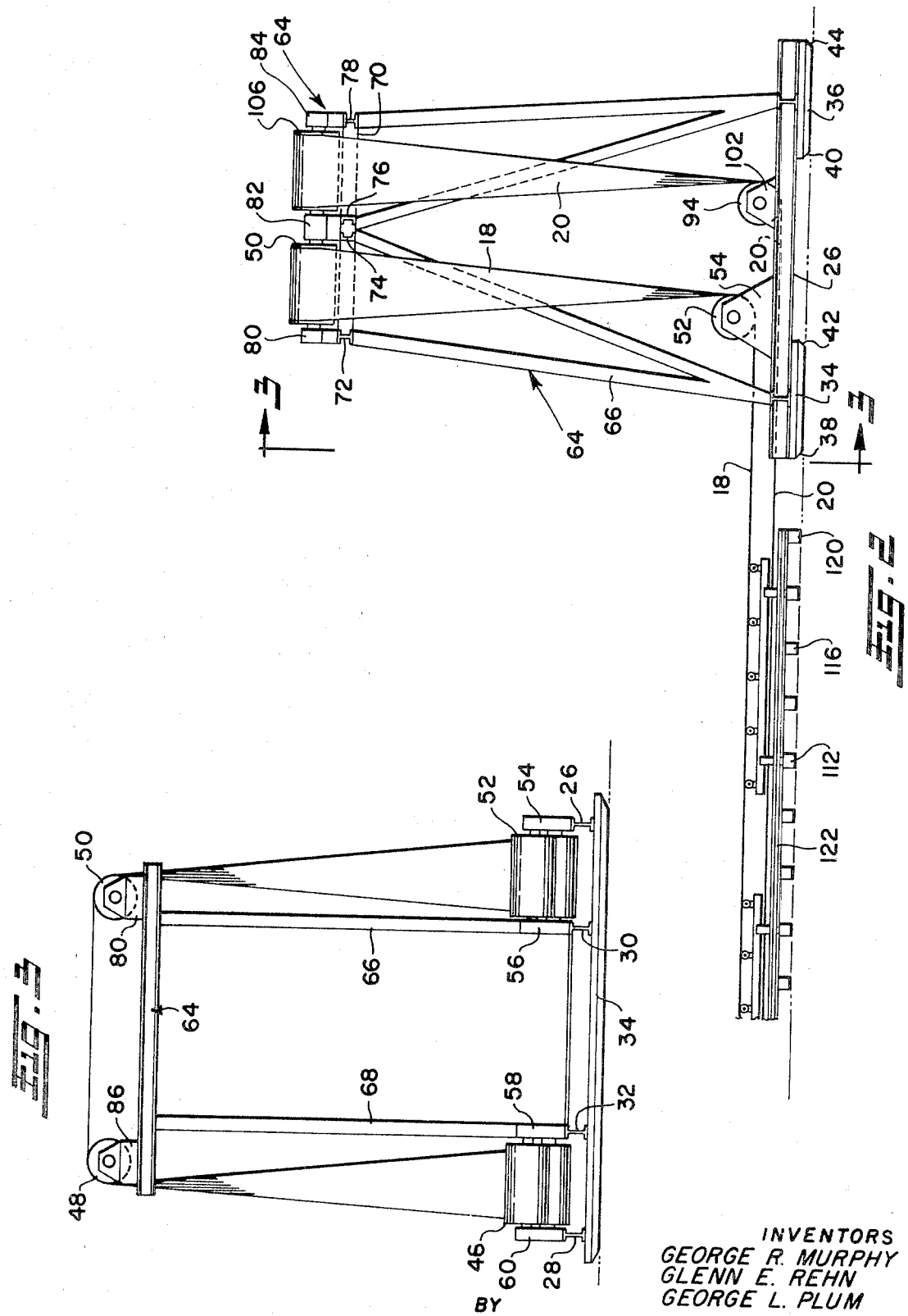
INVENTORS
GEORGE R. MURPHY
GLENN E. REHN
GEORGE L. PLUM
BY
McNenny, Farrington, Pearne & Gordon
ATTORNEYS

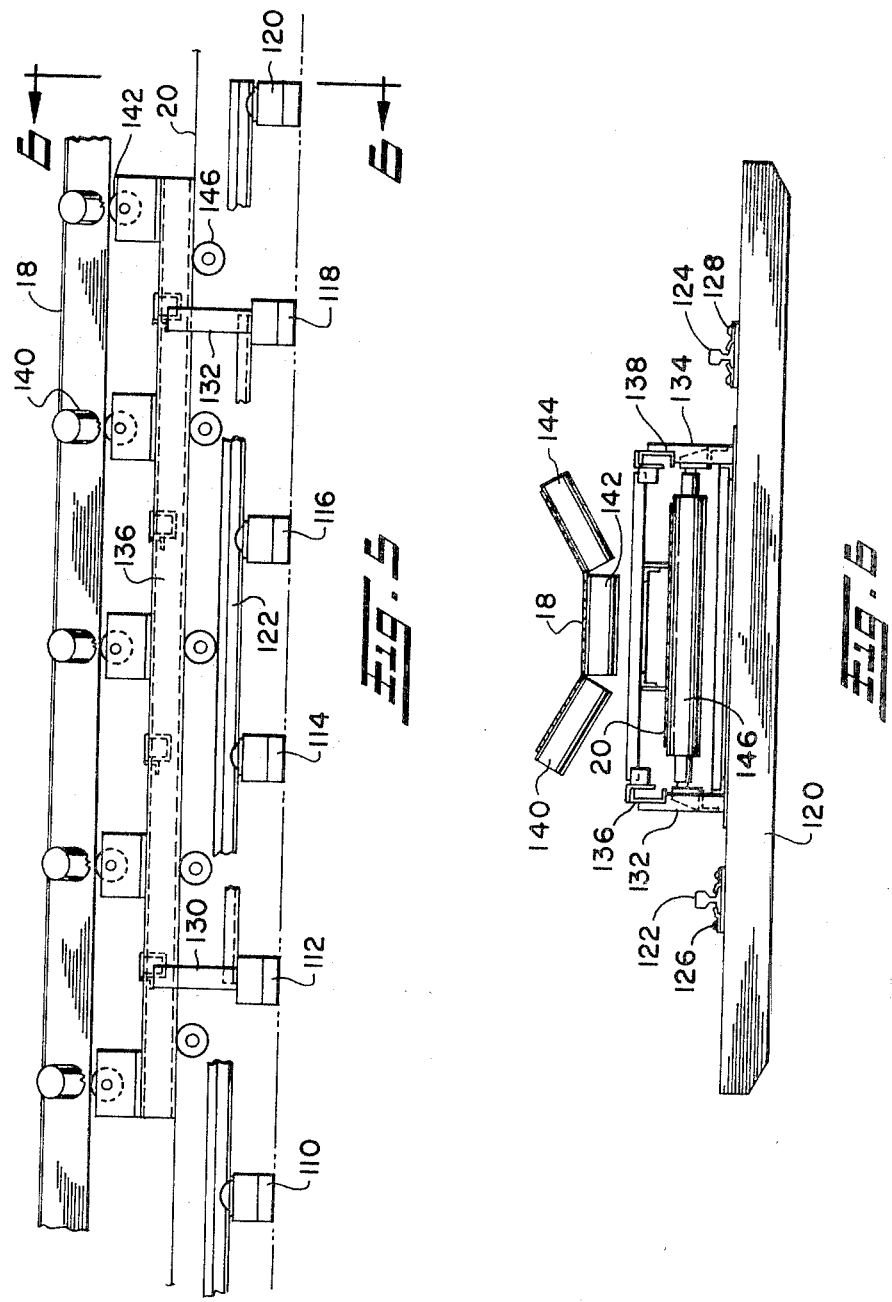

ENDLESS CONVEYOR-BELT SYSTEM AND BELT DIRECTION

BACKGROUND OF THE INVENTION AND PRIOR ART

This invention relates, as indicated, to a conveyor system, and more particularly to a conveyor system which is particularly adapted for use in the handling of bulk materials, e.g., in mining operations or earth fill operations. Conveyors used in locations where the foregoing operations occur are usually of considerable length, often in excess of several thousand feet. In the course of conducting such operations it is not infrequent that the length of usable conveyor belt surface varies so substantially that either the conveyor system must be completely restructured and the conveyor belt cut and spliced, or means provided for storing variable lengths of conveyor belt not necessary to the actual conveying operation. Belt-storage systems are well known, and typical examples are illustrated in the U.S. Pat. to Liggett No. 902,421, the U.S. Pat. to Long No. 3,146,878, and the U.S. Pat. to Lorvi No. 3,251,455. The conveyor systems of the type herein contemplated are generally skid mounted, movable belt conveyors. An example of a skid-mounted system and mode of moving such a system is illustrated in the Koski et al. U.S. Pat. No. 3,161,282.

The present invention provides an improved belt storage system of greater flexibility and simplicity and which permits rapid adjustment of the length of the active conveyor belt portion by removal of belt supporting sections mounted on skids from a storage portion to the active conveyor portion, and vice versa whereby the length of the respective belt subsystems may be correspondingly adjusted as may be required in the field.

These advantages are made possible by a novel belt direction changing and translating apparatus which is also desirably mounted so as to be movable in the same manner as the conveyor belt system and which because of its construction may be inserted at a desired point between the head pulley and the tail pulley of a skid mounted conveyor belt system so as to divide the conveyor system into an active conveyor portion and a belt storage portion.

BRIEF DESCRIPTION OF THE INVENTION

Briefly stated, the present invention is in an endless conveyor belt system having an endless belt, for example of conventional endless belt structure, which belt is of predetermined length and which system comprises in combination a conveyor unit or portion including an elongated conveyor belt portion having first and second reaches, e.g., upper and lower reaches, and a head pulley around which the belt is reeved. The apparatus further includes a selectively positionable belt direction changing and translating unit coacting with the conveyor unit and having for each of the first and second conveyor belt reaches first pulley means for changing the direction of movement of the belt surface from a first direction to a second angularly related direction and second pulley means for changing the direction of movement of the belt surface from the second direction to a third direction angularly related to the second direction. The system is further characterized by a storage unit which coacts with the belt direction changing and translating unit and includes an elongated storage belt portion having first and second reaches, e.g., upper and lower reaches, and a tail pulley around which the belt is reeved, the first and second reaches of the storage unit being continuations, respectively, of the first and second reaches of the conveyor unit. This system is desirably, although not essentially, mounted in whole or in part on skids. When the apparatus is so mounted on skids, it is common practice to fit the skids with longitudinally extending rails, the skids functioning as ties for the rails. In the manner shown in the aforesaid patent to Koski et al., the track structure may be shifted laterally by any suitable means such as a caterpillar tractor preferably fitted with an outrigger structure carrying a rail contacting device for seizing one of the rails and sliding or rolling along the length of the rail as the caterpillar tractor moves ahead parallel with the track structure after having shifted it laterally the desired distance at one of its ends. The method of shifting the track structure is not new so neither it nor the grab device need be described in greater detail.

As indicated above, one of the features of the present invention is that the belt direction-changing and translating apparatus is one which may be detached entirely from the endless belt-conveying system or inserted into an existing endless belt-conveying system mounted on skid-supported, removable sections between the head and tail pulleys thereof and, consequently, the structure of this apparatus is believed novel per se.

BRIEF DESCRIPTION OF THE DRAWINGS

The present invention may be better understood by having reference to the annexed drawings wherein:

FIG. 1 is a top plan view showing a part of an active conveyor belt portion, a belt direction changing and translating unit, and a storage unit.

FIG. 2 is a side elevation of the apparatus shown in FIG. 1.

FIG. 3 is a view of a belt direction changing and translating unit in accordance with the present invention as it appears in the plane indicated by the line 3—3 in FIG. 2.

FIG. 4 is a side view of a tail pulley assembly for the storage unit as it appears in the plane indicated by the line 4—4 in FIG. 1.

FIG. 5 is a side elevation on a larger scale showing the details of a typical shiftable conveyor belt support section and showing the skids, the rails and the roller support means for the upper and lower reaches of the endless belt.

FIG. 6 is an end view of a typical shiftable section as it appears in the plane indicated by the line 6—6 in FIG. 5.

DETAILED DESCRIPTION OF THE DRAWINGS

In general, the structure of the endless conveyor belt is well known and such belts are readily available on the market. A particularly suitable conveyor belt is one which is 60 inches wide and is a steel cable reinforced rubber belt. The structure of the skids and the mounting of the rails and belt-supporting rollers thereon is also conventional. The skids may, for example, be steel, steel-sheathed wood, or wooden beams. Conveyor belt rollers for the active conveying reach and idler rollers for the lower or return reach are also of conventional design and structure and any of the numerous available belt rollers and idlers may be used in fabricating the conveyor unit and the storage unit in accordance with the present invention. As indicated, the skid mounted supports of a preferred embodiment of the present invention are usually of predetermined modular length, e.g., 20 feet. In the system of the present invention, one or more of these skid-mounted support modules may be transferred from the storage unit to the conveyor unit so as to lengthen the conveyor unit and correspondingly shorten the storage unit. In effecting this change, the belt direction-changing and transfer unit must be moved farther from the head pulley at the end of the active conveying reach of the endless belt and the tail pulley assembly must be moved closer to the belt changing and transfer unit. Likewise, the reverse procedure may be followed to effect a reduction in the length of the active conveyor unit and an increase in the length of the storage unit. Under these circumstances, the belt direction-changing and translating unit will be moved closer to the head pulley of the conveyor belt.

It will be seen, therefore, that there is provided a belt of a predetermined length, the length of the active conveying reach of which may be adjusted at will to accommodate any particular situation with a corresponding adjustment in the length of the storage unit. Splicing of the endless conveyor belt is obviated entirely.

Referring now more particularly to FIGS. 1–4, there is here shown a portion of a conveyor unit generally indicated at 10, a belt direction changing and translating unit generally shown at 12, and a storage unit generally shown at 14. The conveyor unit as shown in FIG. 1 includes a conventional steel cable reinforced rubber belt 16. The belt 16 is reeved around a head pulley of conventional design, not shown, to provide an active conveying upper reach 18 of the belt and a return or lower reach 20 of the belt. The storage unit 14 includes a continuation of the upper reach 18 which is reeved around a tail pulley assembly generally indicated at 22 which may also be of conventional design and structure. The lower reach 20 resulting from the reeving of the endless belt 16 around the tail pulley 24 is a continuation of the lower reach 20 of the conveyor unit 10. The storage unit 14 is disposed alongside the conveyor unit and accordingly provides in this embodiment a feature which conserves lateral space oftentimes unavailable and often required in other belt-storage systems such as, for example, that illustrated by Liggett in U.S. Pat. No. 902,421.

Both the conveyor unit 10 and the storage unit 14 include like skid-mounted sections or modules which in turn include supports and rollers for the upper reach 18 and the lower reach 20. The details of such apparatus in a preferred embodiment are shown in FIGS. 5 and 6 and will be discussed in greater detail below.

To effect the 180° change in direction of movement of the belt illustrated in the preferred embodiment shown in FIG. 1, there is provided the belt direction-changing and translating unit generally indicated at 12 which coacts between the head pulley (not shown) of the conveyor unit and the tail pulley assembly 22 of the storage unit 14. As shown in FIGS. 1-3, the belt direction changing and translating unit 12 includes a base framework formed of end beams 26 and 28, and intermediate beams 30 and 32. These are mounted on and maintained in predetermined spaced relation by pans 34 and 36 both of which are of boxlike construction, and each having beveled longitudinal extending front surfaces 38 and 40, respectively, and trailing beveled surfaces 42 and 44, respectively.

In the embodiment shown a 180° change in direction is effected for each of the reaches 18 and 20 by separate pulley means. The pulley system for the upper reach 18 includes lower pulley 46 and upper pulley 48, and the second pair of pulleys being composed of upper pulley 50 and lower pulley 52. Lower pulleys 46 and 52 are mounted adjacent the base frame 26, 28, 30 and 32 on suitable support brackets, e.g., brackets 58 and 60, and brackets 54 and 56, respectively. The mounting for rotation of the pulleys 46 and 52 in the brackets 58 and 60, and brackets 54 and 56, respectively, follows known practice. The pulleys 52 and 46 are desirably mounted for rotation on a common axis 62 (FIG. 1) which axis is perpendicular to the direction of movement of the first reach of the conveyor belt 16 in each the conveyor unit 10 and the storage unit 14. Pulleys 46 and 52 serve to change the direction of movement of the conveyor belt upper reach and the storage unit upper reach as will hereinafter appear. In order to translate the belt laterally to provide for the side-by-side relationship of the conveyor unit 10 and the storage unit 14, there are provided upper pulleys 48 and 50 which are mounted for rotation in an elevated framework generally indicated at 64. The elevated framework 64 is supported on a pair of upstanding W-frames 66 and 68 including side rail 70 and crossbeams 72, 74, 76 and 78. A side rail corresponding to side rail 70 is not shown in FIG. 2. The side rails, e.g., side rail 70, and the perpendicularly related crossbeams 72, 74, 76 and 78 define a boxlike structure which is supported by the W-frames 66 and 68 which are in turn anchored to the intermediate beams 30 and 32. This boxlike structure supports bearing mounting structures 80, 82 and 84, and bearing mountings 86, 88 and 90. Pulleys 48 and 50 are journaled for rotation about parallel axes which are also desirably although not essentially parallel to the longitudinal axes of the conveyor unit upper reach 18 and the storage unit upper reach 18.

In reeving the upper reach 18 of the endless belt 16 through the first and second direction-changing and translating pulley systems above described, as shown best in FIG. 2, the belt passes underneath the lower pulley, e.g., the pulley 52, and is twisted in a clockwise manner and passes over the upper pulley 50 thence across a lateral span over upper pulley 48, and again twisted in a clockwise manner for passage beneath pulley 46 for exit out to the conveyor unit 10. Thus, the direction of movement of the belt through this mechanism is effectively changed twice at 90° (in plan) so that the belt now follows a path 180° related to the original direction of travel. The upper surface of the belt 16 in the conveyor unit 10 is also upwardly disposed in the storage unit 14. The mountings for the pulleys which are shown in FIGS. 1-4 inclusive yield the best results although alternate mountings for the pulleys may be used.

The foregoing description details the mounting of the belt direction changing and laterally translating mechanism for the upper reach 18 of the endless belt 16. An identical system is provided for changing the direction and laterally translating the belt portion constituting the lower reach 20. Thus, there are provided a pair of lower pulleys 92 and 94 carried adjacent the base framework and journaled for rotation in suitable bearing mountings 96 and 98, and bearing mountings 100 and 102. As clearly shown in FIG. 2, the elevation of the lower rollers coacting with the lower reach 20 is somewhat less than the elevation of the lower rollers 46 and 52 which coact with the upper reach 18, to account for the vertical displacement of the upper and lower reaches. The lower pulleys 92 and 94 are desirably mounted for rotation on a common axis 104, which axis is perpendicular to the travel of the belt in the conveyor unit 10 and the storage unit 14. Also in like manner, upper pulleys 106 and 108 are journaled for rotation in bearing mountings 82 and 84, and bearing mountings 88 and 90, respectively.

The lower reach 20 is reeved throughout the pulley system above described in the same manner as the upper reach 18, the belt going through two 90° turns in the same direction. Thus with respect to the lower reach 20, the direction of movement of the belt is effectively rotated through 180°, and the disposition of the belt portions, i.e., the conveyor unit portion and the storage unit portion, are effectively displaced a distance sufficient so that they do not interfere one with the other.

It can now be appreciated that inasmuch as the twisting of the belt is brought about between a pair of upper and lower pulleys without intervention of any other pulleys, the upper and lower pulleys being related to each other by 90° of relative rotation, the elevation of the upper pulley with respect to the lower pulley must be that which is sufficient to allow for a 90° twist in the belt without imposing undue strain upon the belt. In the present case, the distance between center lines of the upper and lower pulleys is approximately 30 feet using 36-inch-diameter diameter pulleys for the upper and lower pulleys.

With the pulleys disposed in the manner above-described in the belt direction changing and translating device, and the framing being as shown in FIGS. 1 to 3, it will be appreciated that by removing the lower pulleys 46, 52, 92 and 94, the entire belt direction changing and translating apparatus may be disengaged from the belt. Alternatively, in a continuous skid-mounted conveyor system, it will be appreciated that a belt direction-changing and laterally translating unit may be inserted at any desired point to yield a configuration for the system such as shown in the plan view in FIG. 1. After the belt reaches have been disposed over the upper pulleys 106 and 108 and 48 and 50, and the conveyor unit portions and the storage unit portions disposed in side-by-side relationship, remounting of the lower pulleys 46 and 52, and 92 and 94, will enable shortening of the conveyor portion and provision of a storage portion. Where it is unnecessary to store any portion of the belt, the belt direction-changing and displacing unit need not be utilized.

While there has been shown a device which results in the disposition of the storage unit 14 alongside the conveyor unit 10, it will be appreciated that by mounting the upper and lower pulleys on axes which are related at angles less than 90°, the storage unit may be disposed in any predetermined angular relationship with the conveyor unit.

Referring now more particularly to FIGS. 5 and 6, there is here shown a typical shiftable section in side and end elevation, respectively. There are provided wooden skids 110, 112, 114, 116, 118 and 120 constituting a shiftable unit which, in one embodiment, is about 20 feet long per module. The skids have a configuration such as shown in FIG. 6. As indicated above, the skids, e.g., skids 110–120 inclusive serve as rail ties for rails 122 and 124, and suitable anchors such as tie plates 126 and 128 are provided in a known manner. The rails 122 and 124 serve not only to facilitate shifting of the conveyor belt in the manner shown in Koski et al. U.S. Pat. No. 3,161,282 but also as a railway for movement of service units such as a cable reel car (not shown) or a traveling hopper car (also not shown). Such service units are conventional and known to those skilled in the art. The skids 110–120 inclusive also provide at intervals support for the reaches of the conveyor belt. As shown in FIGS. 5 and 6, the support means may include upstanding members 130, 132 and 134, and longitudinally extending support rails 136 and 138. The support rails provide supports for conveyor belt portion 16 in the form of troughing idlers 140, 142 and 144. The support of the active conveyor reach 18 by troughing idlers follows conventional practice. Likewise with respect to the return or lower reach 20, idler rolls such as idler roll 146 may be provided although at less frequent intervals than the troughing idlers for the upper reach which, of course, must carry a load.

The shiftable modular sections such as illustrated in FIGS. 5 and 6 are insertable in either the conveyor unit 10 or the storage unit 14 and thus in accordance with the demands of the situation, one or the other of the conveyor unit 10 or the storage unit 14 may be altered in length by transfer of such shiftable units or sections from one to the other.

What is claimed is:

1. An endless conveyor-belt system having an endless belt of predetermined length and comprising in combination:
   a. a conveyor unit including an elongated conveyor belt portion having first and second reaches vertically displaced from each other, the upper face being upwardly disposed in the first reach and downwardly disposed in the second reach, and a head pulley around which said belt is reeved;
   b. a movably positionable belt direction-changing and translating unit movably translatable along the horizontal axes of said conveyor unit reaches or vertically displaceable along axes perpendicular to said horizontal axes, coacting with said conveyor unit and having for each of said first and second conveyor belt reaches:
      1 first pulley means for changing the direction of movement of the belt surface from a first direction to a second angularly related direction, and
      2. second pulley means for changing the direction of movement of the belt surface from said second direction to a third direction angularly related to said second direction; and
   c. a storage unit angularly disposed alongside said conveyor unit, said storage unit coacting with said belt direction-changing and translating unit and including an elongated storage belt portion having first and second reaches and a tail pulley movably positionable along the same axes as said belt direction changing and translating unit, said belt being reeved around said tail pulley, the first and second reaches of said storage unit being continuations, respectively, of the first and second reaches of said conveyor unit.

2. An endless conveyor-belt system in accordance with claim 1 in which each of the conveyor unit, the belt direction-changing and translating unit, and the storage unit is mounted on skids.

3. An endless conveyor-belt system in accordance with claim 2 in which the skids supporting the conveyor unit and the skids supporting the storage unit have like structure whereby skids from one unit may be selectively removed and added to the other unit to change the length of the respective units.

4. An endless conveyor-belt system in accordance with claim 1 wherein the first and second pulley means each include a pair of spaced pulleys rotating on angularly related axes.

5. An endless conveyor-belt system in accordance with claim 4 wherein the spaced pulleys rotate on 90° related axes, and in reeving the first and second reaches of the belt each through the respective first and second pulley means, the belt is twisted intermediate the pulleys of the first pair of pulleys and intermediate the pulleys of the second pair of pulleys through 90° in the same direction, and the storage unit is disposed adjacent the conveyor unit.

6. An endless conveyor-belt system having an endless belt of predetermined length as part of a conveyor unit, a movably positionable belt direction-changing and translating unit, and a storage unit for said belt, wherein the belt direction-changing and translating unit comprises:
   a. a base;
   b. an upstanding frame on said base;
   c. a first pair of first reach pulleys mounted proximally to said base for rotation about a common axis perpendicular to the direction of movement of the first reach of said conveyor belt portion and the first reach of said storage belt portion, said pulleys being mounted for direction changing coaction with said first reaches, respectively;
   d. a second pair of first reach pulleys supported on said frame above said base for rotation about parallel axes in turn parallel to the center lines of the conveyor belt and storage belt portions, respectively, for laterally translating the belt between the conveyor unit and the storage unit;
   e. a first pair of second reach pulleys mounted proximally to said base for rotation about a common axis perpendicular to the direction of movement of the second reach of said conveyor belt portion and the second reach of said storage belt portion, said pulleys being mounted for direction-changing coaction with said second reaches, respectively; and
   f. a second pair of second reach pulleys supported on said frame above said base for rotation about parallel axes in turn parallel to the centerlines of the conveyor belt and storage belt portions, respectively, for laterally translating the belt between the storage unit and the conveyor unit.

7. An endless conveyor-belt system in accordance with claim 6 which is further characterized by a plurality of earth skids underlying and supporting said base.

8. An endless conveyor-belt system in accordance with claim 6 wherein the parallel axes of the second pair of second reach pulleys are continuations of the parallel axes of the second pair of first reach pulleys.

9. An endless conveyor-belt system in accordance with claim 8 wherein the axes of each of said second pairs of pulleys lie in a common plane parallel to the plane of the base.

10. An endless conveyor belt direction-changing and translating unit adapted for use in an endless conveyor-belt system having an endless conveyor belt looped about a head pulley and a tail pulley to define the first and second reaches of predetermined length, said unit being adapted to occupy a position between the head and tail pulleys to define a conveyor belt portion and a storage belt portion and comprising in combination:
   a. a base;
   b. an upstanding frame on said base;
   c. a first pair of first reach pulleys mounted proximally to said base for rotation about a common axis perpendicular to the direction of movement of the first reach of said conveyor belt portion and the first reach of said storage belt portion, said pulleys being mounted for direction-changing coaction with said first reaches, respectively;
   d. a second pair of first reach pulleys supported on said frame above said base for rotation about parallel axes in turn parallel to the centerlines of the conveyor belt and storage belt portions, respectively, for laterally translating the belt between the conveyor unit and the storage unit;

e. a first pair of second reach pulleys mounted proximally to said base for rotation about a common axis perpendicular to the direction of movement of the second reach of said conveyor belt portion and the second reach of said storage belt portion, said pulleys being mounted for direction-changing coaction with said second reaches, respectively; and f. a second pair of second reach pulleys supported on said frame above said base for rotation about parallel axes in turn parallel to the centerlines of the conveyor belt and storage belt portions, respectively, for laterally translating the belt between the storage unit and the conveyor unit.

11. An endless conveyor belt direction-changing and translating unit in accordance with claim 10 wherein the base is supported on skids.

* * * * *